April 4, 1961 T. KILBURN ET AL 2,978,592
INDUCTIVE CONTROL ARRANGEMENTS
Filed May 31, 1956 3 Sheets-Sheet 1

INVENTORS:
TOM KILBURN
GEORGE R. HOFFMAN
MICHAEL ANSON MACLEAN

By: Stevens, Davis, Miller & Mosher
Attorneys

United States Patent Office 2,978,592
Patented Apr. 4, 1961

2,978,592
INDUCTIVE CONTROL ARRANGEMENTS

Tom Kilburn, Urmston, George Richard Hoffman, Sale, and Michael Anson Maclean, Manchester, England, assignors to National Research Development Corporation, London, England, a corporation of Great Britain Filed May 31, 1956, Ser. No. 588,361
Claims priority, application Great Britain June 4, 1955
3 Claims. (Cl. 307—88)

The present invention relates to inductive control arrangements and more particularly to control arrangements which enable the inductance value of a coil winding upon a magnetic core to be varied in a simple manner. The invention is also concerned with a static switching device in which the switching effect is produced by change of the inductance value of a coil winding upon a magnetic core forming part of said switching device. The invention is further concerned with switching arrangements employing such switching devices as the basic elements thereof.

According to its broadest aspect, the invention provides a method of altering the inductance value of a coil winding upon a magnetic core by subjecting the material of such magnetic core to an alternating magnetizing force whose alternation frequency is high compared with the frequency of the current applied to or operative in said coil winding and then varying the intensity of such magnetising force to produce a change in the inductance value of the coil winding.

In one variable inductance arrangement according to the invention, the coil winding whose inductance value is to be varied is wound on a, preferably continuous, core of magnetic material and the control arrangements consist of a second or control winding also inductively coupled to said core, such control winding being arranged to be supplied with alternating current of suitable current amplitude and having a frequency which is high compared with the frequency of the current applied to or operative in the first coil winding. For example, if the signal current applied to or operative in the first coil winding has a frequency of 100 kc./s., the value of the inductance of such first coil winding may be changed by applying a control current having a frequency of 1 mc./s. to the control winding. The frequency of the control current is, however, not critical and variation of the inductance value of the first coil winding can be obtained using a control current frequency of 10 mc./s. Again, if the signal current frequency is 10 kc./s., the frequency of the control current should be of the order of 100 mc./s. It will, however, be appreciated that these figures are given by way of example only and the invention is in no way limited thereto.

There are many applications of the invention. For instance the aforesaid coil winding may form part of a tuned circuit in an alternating current signal circuit which is required repeatedly to scan a band of frequencies. This can be effected by use of the control arrangements according to the invention, a smooth variation in the inductance of the coil winding being effected by continuous variation of the amplitude of the control current.

Another application of the invention is to the provision of a high-speed switching device for controlling the connection of an alternating or pulse current source to a utilisation device, and according to this aspect of the invention, such a switching device comprises a transformer arrangement having a, preferably continuous, core of magnetic material on which are provided a first or input winding arranged for connection to said current source, a second or output winding arranged for connection to said utilisation device and a third or control winding, together with controllable means for supplying the higher frequency alternating control current of said control winding when a signal applied to the first or input winding is required to be effective in the utilisation device connected to the second or output winding.

One of the difficulties in the use of most existing forms of switching device arranged for high speed operation is that the operation of the device from the non-conducting to the conducting condition is accompanied by the production of transients which limit the possible speed of operation of the device since it is usually necessary to allow time for such transients to decay. The switching device of the present invention has the advantage that it is substantially free from transient effects and hence is capable of higher speeds of operation compared with known devices.

The switching device according to the invention operates by virtue of an increase in the value of the inductance of the coil windings when the higher frequency control current is applied to the control winding so that, assuming the signal current applied to the input coil winding is from a constant current source, the voltage across such input coil winding and hence across the output coil winding on open circuit will increase with the application of the control current. The voltage change across the output coil is sufficient to provide a switching discrimination, that is to say, in the absence of the control current the device effectively provides an open-circuit condition while in the presence of the control current the device effectively provides a closed-circuit condition.

Improved discrimination may be obtained by the use of more than one transformer arrangement in the switching device and the device may also be employed as a basic unit in forming a switching arrangement corresponding to a contact pyramid or tree-circuit.

In order that the nature of the invention may be more readily understood it will now be described in greater detail and by way of example only with reference to the accompanying drawings in which:

Fig. 5 is a schematic diagram of a multi-stage switching arrangement according to the invention and employing, by way of example, a number of devices each similar to that shown in Fig. 2, while

Figure 1:
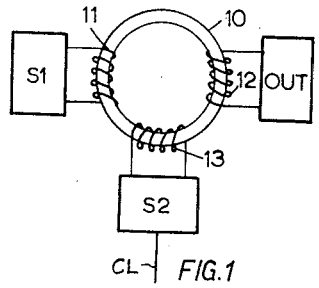
Fig. 1 is a schematic diagram showing a high-speed switching device embodying the invention.

Referring first to Fig. 1, which shows the application of the invention to the provision of a high-speed switching device, a continuous toroidal shaped core 10 of magnetic material is provided with a first or input coil winding 11 and a second or output coil winding 12. The input winding 11 is shown connected to a constant current source S1 which may be of any suitable known form providing an alternating or pulse output at a frequency of, say, 100 kc./s. The output winding 12 is shown connected to a utilisation device, shown schematically by the symbol OUT. This also may be of any suitable known form, for instance, a writing or recording head of a magnetic tape or drum information storage device. A control winding 13 is also provided on the magnetic core 10 and this winding is arranged to be fed from a source S2 of alternating control current at a frequency which is high compared with that of the source S1, for instance 1 mc./s. Such control current source S2 may also be of any suitable known form, for instance, a thermionic valve oscillator, but its output is arranged to be controllable as to its amplitude by means of a switch control voltage on a control lead CL. The voltage on such lead CL may be arranged as a bias control voltage for an amplifier valve incorporated in the source S2 whereby the output from such source may be either zero or at some predetermined optimum value according to the control voltage value.

When a high frequency control current of suitable amplitude from source S2 is caused to flow through the control winding 13, the voltage at the signal frequency of the source S1 which is developed across the output winding 12 on open circuit is found to increase substantially, e.g. approximately seven times, with respect to the signal frequency voltage which is developed across such output winding 12 in the absence of any high-frequency control current in the winding 13.

Figure 6:
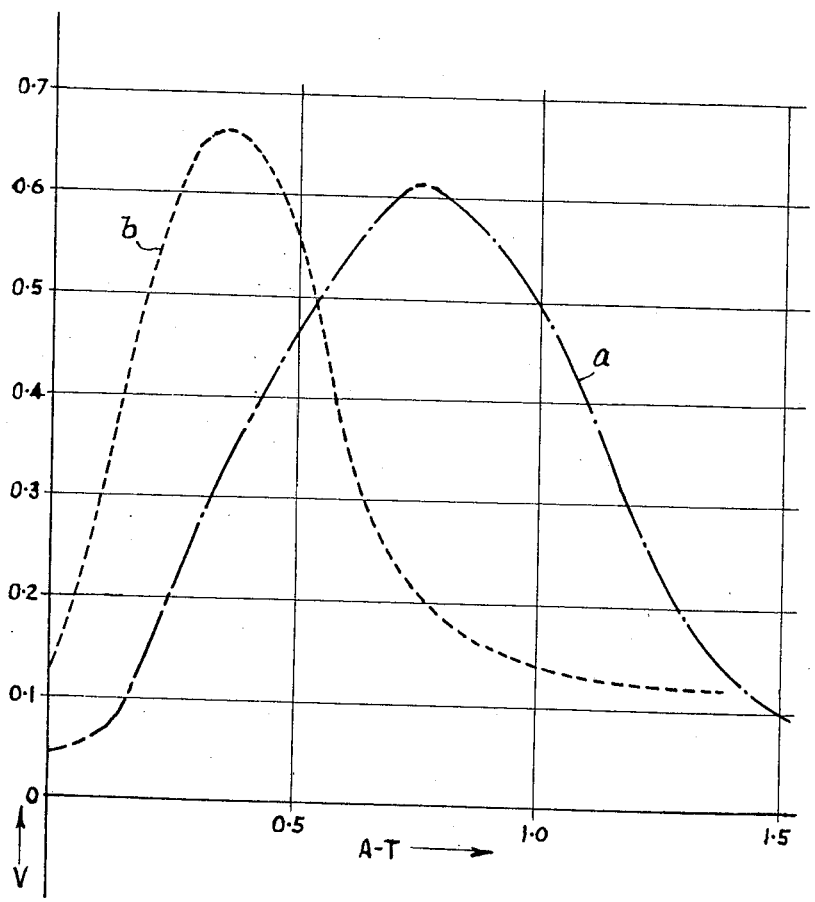
Fig. 6 is a graph illustrating the relationship between inductance and control current values at two different ambient temperatures, using one particular core and winding arrangement.

Fig. 6 of the drawings illustrates the experimental results obtained with one particular arrangement according to Fig. 1, using as the magnetic core 10, a ring storage core of Mullard type FX–1508 composed of Ferroxcube grade D2 ferrite material and having an outer diameter of 0.08 inch (2 mm.), an inside diameter of 0.05 inch (1.25 mm.) and a thickness of 0.025 inch (0.625 mm.). The signal input from source S1 was in the form of 100 kc./s. pulses with a constant current of such amplitude, with relation to the coil winding 11, that the core magnetisation value was 0.25 ampere-turn. The control current frequency from source S2 was 1 mc./s. and the amplitude thereof variable from zero up to a value such that, with relation to the winding 13, which was in the form of a single conductor passing through the core ring, the control current magnetisation had a maximum value of about 1.5 ampere-turns.

As will be seen from curve $a$ of Fig. 6, indicating the results obtained at a normal room temperature of 16° C. an output of less than 0.1 volt at the signal frequency of 100 kc./s. obtained from the output coil winding 12 in the absence of any control current in the winding 13, rose progressively to a value of over 0.6 volt as the control current was increased to a value corresponding to approximately 0.75 ampere-turn and then fell again to its original value as the control current was further increased in value. Results of substantially similar form were obtained with a higher ambient temperature of 140° C. as shown by curve $b$, although the maximum value, slightly higher at 0.66 volt was obtained with a lower value of control current around about that corresponding to 0.35 ampere-turn.

Thus discrimination in the ratio 7:1 is capable of being provided with the arrangement shown in Fig. 1 and it is found that the operation of the switching device under the control of the high-frequency control current takes place substantially entirely without transient effects. It will of course be understood that this figure for the discrimination ratio is particular to the arrangement described and other figures may be obtained using different core material and different windings. Further it is not essential that the control current frequency should be 1 mc./s. For instance, the control frequency may be 10 mc./s. but the value of 1 mc./s. is one which it has been found convenient to use.

Figure 2:
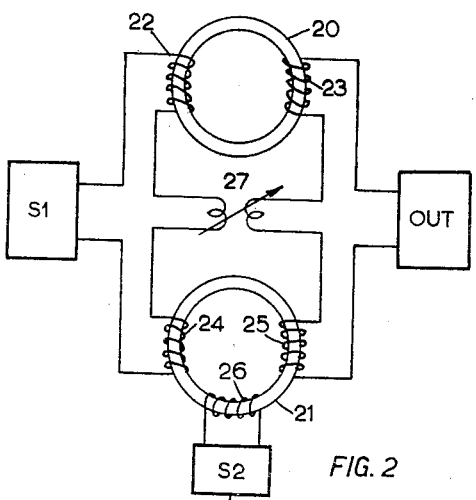
Fig. 2 is a schematic diagram showing an alternative form of high-speed switching device embodying the invention.

Improved discrimination can be obtained by using a balanced arrangement as shown in Fig. 2 of the drawings. In this modified arrangement two toroidal cores 20 and 21 are provided, of which the core 20 is provided only with input and output coil windings 22 and 23 respectively. The core 21 is however provided with input and output coil windings 24 and 25 respectively similar to the windings 22 and 23 and also with a control winding 26 connected to a suitable controllable source of high frequency control current S2 having a frequency, say, of 1 mc./s. The input windings 22 and 24 of the two cores 20, 21 are connected in series and in the same sense with the source S1 of alternating current of frequency 100 kc./s., say. The output windings 23 and 25 of the cores are connected in series but in opposite sense with a utilisation device OUT to give a balanced circuit, the balance of the circuit being adjusted by means of the variable mutual inductance coupling device 27 to give zero output to the device OUT in the absence of any control current in the winding 26. With this arrangement it is found that discrimination ratios of the order of 200:1 can be obtained with substantially no transient troubles.

Figure 3:
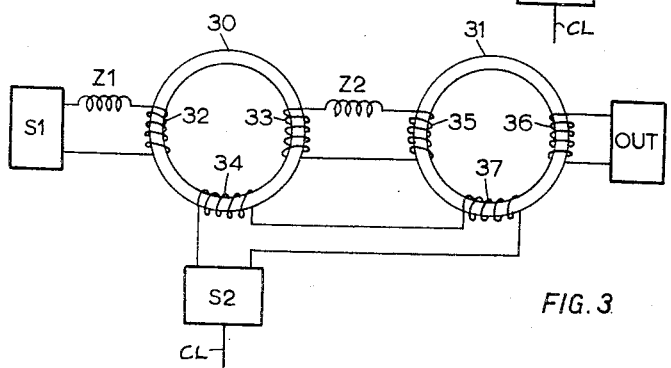
Figs. 3 and 4 are schematic diagrams showing further alternative forms of high-speed switching devices according to the invention.

A further form of switching device embodying the invention is shown in Fig. 3. This arrangement comprises two toroidal cores 30 and 31 each having input, output and control windings 32, 33, 34 and 35, 36 and 37 respectively wound thereon. The two control windings 34 and 37 are connected in series with the controllable high-frequency control current source S2. In this embodiment the output coil winding 32 of the core 30 is arranged in series with the input coil winding 35 of the core 31 and an impedance Z2 is inserted in this series circuit so that the output from coil 33 appears as a substantially constant current source as viewed from the input coil 35. The impedance Z1 performs a similar function between the source S1 and the coil winding 32.

In one particular practical embodiment of this form employing 2 mm. ferrite cores similar to that already described with reference to Fig. 1, the ratio of the value of each of the impedances Z1, Z2 to the impedance of the associated input coil windings 32, 35 was 5 : 1 measured with the control current switched on and to compensate for the drop of voltage across the impedances, each transformer was arranged to have a step up ratio of 6 : 1. This was effected by forming the input coil winding 32 with three turns, the output coil winding 33 and input coil winding 35 with 18 turns each and the output coil winding 36 with 108 turns. A discrimination ratio of 400 : 1 was obtainable with this device using a control current having a frequency of 1 mc./s.

Figure 4:
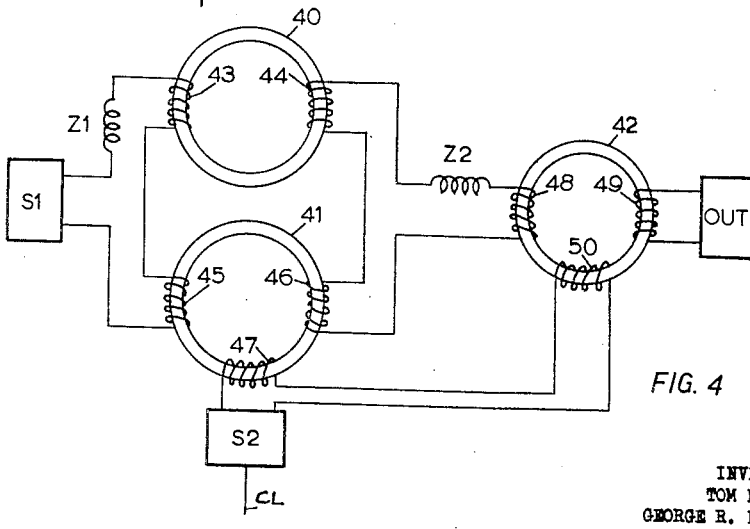

Another embodiment according to the invention is shown in Fig. 4 which is, in effect, a combination of the two arrangements shown in Figs. 2 and 3 respectively, the cores 40 and 41 with their windings 43, 44 . . . 47 corresponding to the cores 20 and 21 of Fig. 2 with their windings 22, 23 . . . 26 while this combination is arranged in series with a third core 42 provided with input, output and control windings 48, 49 and 50. The impedances Z1 and Z2 perform a similar function to those of Fig. 3. The two control windings 47 and 50 are connected in series with the controllable high frequency control current source S2 as in Fig. 3. It will be noted, however, that the balanced portion of this embodiment is not provided with the mutual inductance coupling device 27 of Fig. 2. A discrimination ratio of 2000 : 1 was obtainable with this device.

Figure 5:
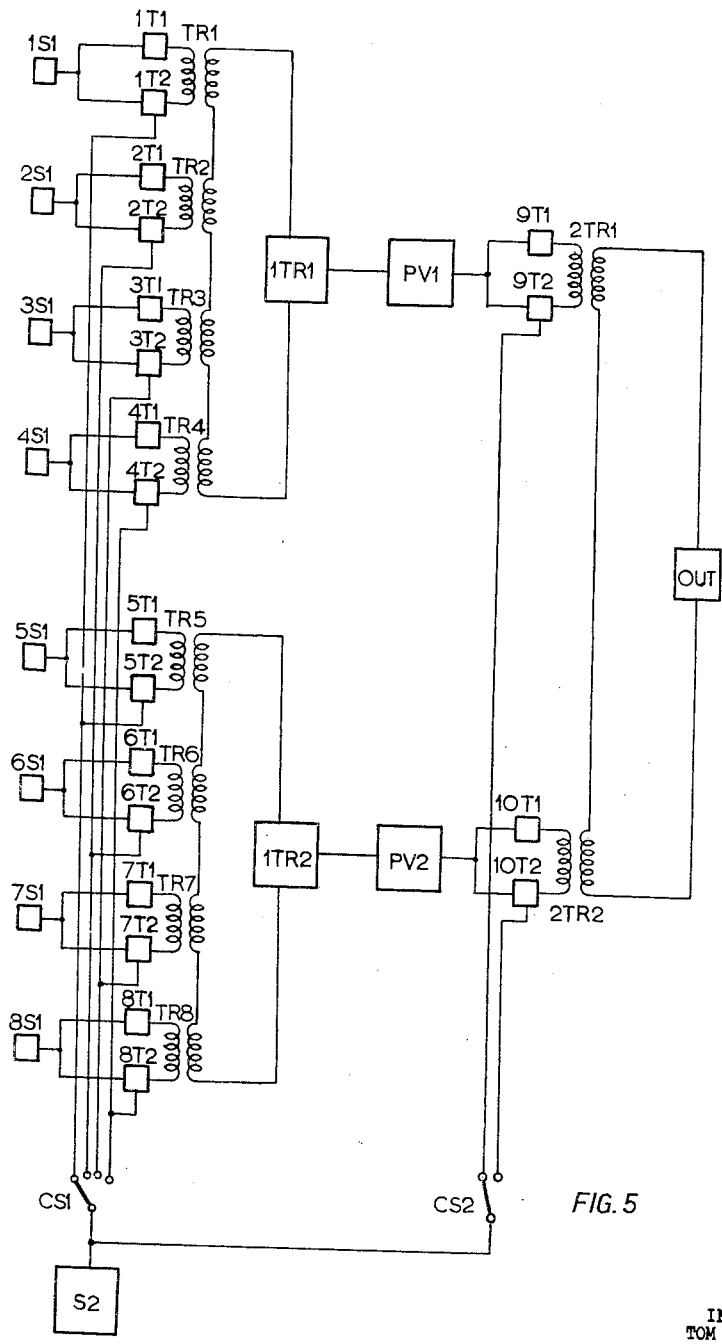

The switching device shown in any of Figs. 2, 3 or 4 can serve as a basic element in the provision of a multistage switching arrangement and Fig. 5 shows one such arrangement using, by way of example, the switching device of Fig. 2 as its basic element. The particular application considered in Fig. 5 is the connecting up, in any desired sequence, of the reading heads of a magnetic drum storage device for instance of the type used in digital computing apparatus. In the example shown in Fig. 5, only eight reading heads are indicated as being sufficient for an understanding of the invention but it will be appreciated that there will normally be many more than eight. The reading heads are indicated by the block symbols referenced 1S1 to 8S1 and each of these provide the signal current input to an associated individual switching device such as shown in Fig. 2. In Fig. 5 the switching devices are shown diagrammatically, the block symbols indicated by the references 1T1, 1T2, 2T1, 2T2 ... 8T2 of Fig. 5 corresponding respectively to the two cords 20 and 21 of Fig. 2 with their associated windings. Thus 1T1 and 1T2 refer to the two cores to which the signal input current from reading head 1S1 is applied and so on. The eight switching devices 1T1, 1T2 to 8T1, 8T2, which form the first selecting stage, are divided into two groups of four, each group having a common output circuit which feeds into an associated second stage switching device consisting of devices 9T1, 9T2 and 10T1, 10T2, also similar respectively to the cores 20, 21 of Fig. 2 with their associated windings. Thus any one of the first stage switching devices 1T1, 1T2 ... 4T1, 4T2 can feed into the second stage switching device 9T1, 9T2, while any one of the first stage switching devices 5T1, 5T2 ... 8T1, 8T2 can feed into the second stage switching device 10T1, 10T2. A single source S2 of high-frequency control current is provided but, in this instance, such source need not itself be provided with amplitude control means. The output from this source S2 is fed to the control windings on the cores 1T2, 2T2 ... 10T2 through suitable selecting arrangements which have been shown diagrammatically in the drawing as two manually operable selector switches CS1 and CS2. The switching devices of each first stage group feed into a common output circuit by means of transformers TR1 ... TR4 for the first group and transformers TR5 ... TR8 for the second group. Each common output circuit includes an output transformer, 1TR1 for the common output circuit of the first group and 1TR2 for the common output circuit of the second group. Each of these transformers feeds into a pentode valve amplifier PV1 and PV2 respectively which thus provide respectively a constant current source for the two switching devices 9T1, 9T2 and 10T1, 10T2 of the second stage. Each of the switching devices feeds into a common circuit which includes a utilisation device OUT.

It will be seen that for each position of the control switch CS1, two switching devices, one in the first group and one in the second group, will be in the "closed" condition, i.e. current will pass from the associated signal current source to the output circuit associated with each group. Thus with the control switch CS1 in the position shown in the drawing, current from signal source 1S1 of the first group and from signal source 5S1 of the second group will pass into the respective output circuits. Selection as between the two groups will be determined by the position of control switch CS2 and with this switch in the position shown in the drawing, the current from source 1S1 alone will be selected and will pass to the utilisation device OUT.

It will be understood that although the particular embodiment described consists of two stages only and has two groups each including four sources, there is no inherent limitation to the number of stages, the number of groups or the number of sources forming each group. In the application to the reading heads of a magnetic drum storage device there is a practical limitation, owing to coding difficulties, in the number of heads in each group but such limitation would not necessarily arise in other applications of the switching arrangement and it will be readily understood that many such applications exist.

It will also be appreciated that while the switching arrangement has been described for the selective association of any one of a number of sources with a single device, it may obviously also be employed for the selective association of a single source with any one of a number of output or utilisation devices.

Other forms of device embodying the invention will be readily apparent to those skilled in the art. For example, the previously mentioned application of the invention to a variable resonant frequency tuned circuit may be explained with reference to Fig. 1 where the block symbol S1 may be either a signal input circuit of, for example, a radio receiver or alternatively, an oscillator of which the winding 11 forms the whole or a part of the frequency-determining or tank circuit. The symbol OUT again represents some form of utilisation circuit such as a subsequent part of a radio receiver. Variation of the amplitude of the control current supplied by the source S2 over a range of values equivalent, for instance, to those corresponding to the range between 0.2 and 0.7 ampere turn in Fig. 6, will provide a smooth variation of the inductance value of the coil winding 11, Fig. 1, and hence of the resonant frequency of the associated circuit. The control voltage applied to the control lead CL, Fig. 1, in this instance, may be of steady value at some particular chosen amplitude and derived, for example, from a potentiometer, or such control lead may be supplied with a repetitive saw-tooth or like waveform for providing a continuous and repetitive frequency scanning action.

While the particular core material referred to in connection with the experimental results shown in Fig. 6, is one having what is commonly called a "square-loop" hysteresis characteristic, other magnetic materials having hysteresis characteristics of more usual form may also be usefully employed in connection with the invention.

We claim:

1. A switching device for controlling the connection of an input alternating current source of alternation frequency $f1$ to a utilization device operative at said frequency $f1$, which comprises a first transformer arrangement having a core of magnetic material upon which are provided first, second and third coil windings, a second transformer arrangement having a core of magnetic material on which are provided first and second coil windings, said core and said first and second coil windings of the second transformer arrangement being similar respectively to said core and said first and second coil windings of said first transformer arrangement, said first coil windings of said first and second transformer arrangements each being arranged for connection to said input current source, a source of alternating control current having a frequency $f2$ which is at least several times greater than said input current frequency $f1$, means connecting said third coil winding of said first transformer arrangement to said alternating control current source, controllable means for supplying control current from said control current source to said third winding, circuit means connecting said second coil windings of said first and second transformer arrangements in series and in signal opposing sense with each other to said utilization device whereby substantially no output signal at said input current frequency $f1$ is available for supply to said utilization device when no current from said control current source is supplied to said third winding and a variable mutual inductance coupling device for providing an adjustable balancing signal current from said input current source directly to said series connected circuit of said second coil windings.

2. A switching device for controlling the connection of an input alternating current source of alternation frequency $f1$ to a utilization device operative at said frequency $f1$, which comprises a first transformer arrangement having a core of magnetic material upon which are provided first, second and third coil windings, a second transformer arrangement having a core of magnetic material on which are provided first and second coil windings, said core and said first and second coil windings of the second transformer arrangement being similar respectively to said core and said first and second coil windings of said first transformer arrangement, said first coil windings of said first and second transformer arrangements each being arranged for connection to said input current source, a source of alternating control current having a frequency $f2$ which is at least several times greater than said input current frequency $f1$, means connecting said third coil winding of said first transformer arrangement to said alternating control current source, controllable means for supplying control current from said control current source to said third winding of said first transformer arrangement, a third transformer arrangement having a core of magnetic material and first, second and third windings, said third transformer arrangement core and first, second and third windings being similar respectively to said core and first, second and third windings of said first transformer arrangement, circuit means connecting said second coil windings of said first and second transformer arrangements in series and in signal opposing sense with each other and in series with said first winding of said third transformer whereby substantially no output signal at said input current frequency $f1$ is applied to said first winding of said third transformer arrangement when no current from said control current source is applied to said third winding of said first transformer arrangement, said second winding of said third transformer arrangement being arranged for connection to said utilization device and said third winding of said third transformer arrangement being connected to said controllable means for supplying control current.

3. A switching device according to claim 2 in which said third windings of said first and third transformer arrangements are connected in series to said controllable means.

References Cited in the file of this patent

UNITED STATES PATENTS

| | | |
|---|---|---|
| 1,544,381 | Elmen et al. | June 30, 1925 |
| 2,444,726 | Bussey | July 6, 1948 |
| 2,685,653 | Orr et al. | Aug. 3, 1954 |
| 2,689,328 | Logan | Sept. 14, 1954 |
| 2,769,925 | Saunders | Nov. 6, 1956 |
| 2,780,772 | Lee | Feb. 5, 1957 |
| 2,801,344 | Lubkin | July 30, 1957 |
| 2,805,407 | Wallace | Sept. 3, 1957 |
| 2,807,776 | Buechler et al. | Sept. 24, 1957 |
| 2,845,611 | Williams | July 29, 1958 |
| 2,871,444 | Piety | Jan. 27, 1959 |